United States Patent [19]
Wilson et al.

[11] Patent Number: 5,414,831
[45] Date of Patent: May 9, 1995

[54] APPARATUS AND METHOD FOR ACCESSING A PLURALITY OF COMPUTER DEVICES HAVING A COMMON ADDRESS

[75] Inventors: Thomas J. Wilson, Pleasanton, Calif.; J. Peter Van Baarsen, Delta, Canada

[73] Assignee: LSI Logic Corporation, Milpitas, Calif.

[21] Appl. No.: 175,810

[22] Filed: Dec. 30, 1993

[51] Int. Cl.⁶ .............................................. G06F 13/10
[52] U.S. Cl. ................................. 395/500; 395/162; 395/275; 395/375
[58] Field of Search ............................... 395/375, 162; 384/242.6

[56] References Cited

U.S. PATENT DOCUMENTS

| | | | |
|---|---|---|---|
| 4,713,759 | 12/1987 | Yamagishi et al. | 395/425 |
| 4,839,794 | 6/1989 | Okura | 395/275 |
| 4,912,698 | 3/1990 | Bitzinger et al. | 395/275 |
| 5,045,995 | 9/1991 | Levinthal et al. | 395/375 |
| 5,065,343 | 10/1991 | Inoue | 395/162 |
| 5,230,041 | 7/1993 | Dinwiddie, Jr. et al. | 395/162 |

*Primary Examiner*—Parshotam S. Lall
*Assistant Examiner*—Brian Ledell
*Attorney, Agent, or Firm*—Honigman Miller Schwartz and Cohn

[57] ABSTRACT

An apparatus and method for accessing a plurality of computer devices having common memory or input-output addresses on buses operating at different speeds. The present invention detects a CPU address request and issues a local bus acknowledge thereto which prevents the CPU core logic from processing the instruction on the other buses. The present invention processes the instruction and upon completion thereof, asserts both CPU BOFF and READY signals on the computer system local bus. The CPU receives the BOFF signal, releases control of the local bus and ignores the READY signal. When the present invention releases the asserted BOFF signal, it then ignores the next local bus cycle because this next local bus signal will be the same as the previous bus cycle. The next CPU bus cycle contains the same information as the previous cycle, and the computer system core logic issues appropriate commands to the other bus interface such as an ISA bus. The present invention monitors the CPU READY signal and, once detected, the present invention re-enables its local bus decode logic in anticipation of the next CPU bus cycle.

4 Claims, 9 Drawing Sheets

APPARATUS AND METHOD FOR ACCESSING A PLURALITY OF COMPUTER DEVICES HAVING A COMMON ADDRESS

BACKGROUND OF THE INVENTION

1. Field of the Invention

This invention relates generally to computer peripheral devices, and in particular, to an apparatus and method for accessing a plurality of computer devices having common memory or input-output addresses on computer system buses operating at different speeds.

2. Description of the Related Technology

Computers, especially personal computers have gained substantial popularity among individual users at work or when working at home. Personal computers are now being utilized for jobs heretofore performed by mainframe computers and mini-computers. The rapidly growing popularity in the use of personal computers may, in part, be attributed to the substantial improvement in its speed of operation, ease of use, data storage capacity, and sophistication in displaying information to the computer user.

This has resulted in personal computers becoming more prevalent in the work place, and with more and more people depending on their livelihoods from the use thereof. Advances in computer technology have created the ability and thus the demand for higher resolution and faster updating of display information presented to the computer user. Typically, this information is displayed in a video form on a cathode ray tube (CRT).

Color is being used more often to display information and the number and resolution of the colors is constantly increasing with each advance in video display technology. The CRT video display requires a video graphics adapter (VGA) to convert the computer digital information into analog information for use by the CRT display. A VGA having high resolution and multiple colors, however, requires a great deal of digital information. This digital information may be transferred from the computer system memory over data and address buses the the VGA.

IBM compatible personal computers use an Industry Standard Architecture (ISA) bus for transferring digital data to and from peripheral devices such as the VGA. The ISA bus, though adequate for early black and white or video color graphics adapter (CGA) technology, does not have sufficient data throughput for quickly updating information to high resolution and color definition VGA systems. The ISA bus is slower than the computer system local bus which transfers information at data rates comparable to the host computer central processing unit (CPU).

In modern high speed computer systems using the more advanced video interface peripherals, the local bus is being used to connect the CPU to those peripherals which require high data throughput such as high resolution and color definition VGA systems. There is, however, a need for operating at least two VGA systems at the same time with the computer system. Examples of requirements for dual video displays are presentation transparency production, creating picture T-shirts, and presenting data simultaneously on both large and small CRT screens. Each video display may require its own VGA, and each VGA may be connected to different computer system bases such as, for example, local bus and ISA bus.

Each VGA which receives the same video data normally shares common CPU address locations, either input/output (I/O) or memory addresses. This is so because it would be inefficient and cumbersome to require the computer system and programs to duplicate data transfers of the same video information to completely different bus address locations.

What is needed is the ability to access I/O or memory address locations of two or more peripheral devices which share common addresses, even though on completely different computer system buses. These devices can be on different speed buses and have different operating times such as access selection and data transfer. Because of different access and data acceptance times between different computer system buses, for example, local and ISA buses, the access acceptance acknowledge signals must necessarily be different.

Various methods of reconciling different bus timing requirements have been attempted or theorized, however, all require some form of modification to existing bus standards and/or require implementation of additional electronic hardware logic to existing standard computer systems.

For example, a local bus device's acknowledge signal is disabled while the CPU processes the acknowledge signal from the other bus (ISA) device. If this is done, both the local bus device and the ISA device data transfers will be governed by the ISA device acknowledge signal only, however, data must be accepted by both devices. This creates a problem which arises if the ISA bus device is able to accept data more rapidly than the local bus device. After the ISA bus device accepts the data, it issues a ready signal to the CPU for more data. The CPU then sends more data on the next bus cycle.

Without additional hardware logic, the local bus device may fall behind the ISA bus device in accepting data since the CPU does not receive the local bus device ready signal because this signal is disabled. Even if an internal first-in first-out (FIFO) memory is used with the local bus device, data will eventually be lost because the local bus device has no way of holding up the CPU bus cycles.

A partial solution to this problem is for the local bus device to issue a CPU hold request. This hold request will force the CPU to release control of the bus upon completion of the current bus cycle, thereby, delaying the start of the next CPU bus cycle. This is only a partial solution because the CPU may be in bus lock when executing the bus cycles in question, thus, the CPU will not respond to the local bus device hold request.

Another possible solution would be to intercept the ready signal coming back from the ISA bus device. Intercepting the ISA bus device ready signal, however, would require re-synchronizing the timing of the bus devices because these devices must be in sync with the CPU bus cycle timing. Intercept of the ISA bus device ready signal would only work if the ISA device and CPU ready signals are isolated, but this requirement adds one additional CPU wait state into each ISA bus cycle. If the ready signals are not isolated, then intercept of the ISA ready signal will, in addition to adding one wait state, most likely prevent the CPU from properly reading data on the buses because the data may not be held valid long enough for proper CPU read operations.

A possible solution to not holding the CPU read operations long enough is to force a not ready on the ISA bus until the local bus device has completed the current command from the CPU. If the local bus returns a ready signal during the current bus cycle, its ready signal must be inhibited. Once the local bus device has finished accepting data, control logic on the ISA bus must either wait for the CPU bus cycle to finish before the ready signal is sent to the CPU, or generate a ready signal if the CPU bus cycle is finished so that the current CPU bus cycle may be terminated. This approach requires additional control logic and there are inherent synchronization problems between the two bus device ready signals. In addition, different logic circuits are required for each bus on which simultaneous data transfers are required.

What is needed is a way to write identical data simultaneously to different peripheral devices such as, for example, VGAs residing on different computer system buses and without losing data or requiring additional hardware logic implementations that make a computer system non-standard. It is important that different bus access speeds be accommodated without adding unnecessary bus cycles or special programming requirements.

SUMMARY OF THE INVENTION

The present invention allows a host 80486 CPU, in a single instruction, to write identical data containing video information to a VGA compatible external palette attached to the local bus and a VGA compatible palette attached to an ISA bus. The present invention solves the aforementioned problems without special additional hardware logic required for each bus, unnecessary additional bus cycles and without loss of data by the slower bus device.

In contrast to prior methods and apparatus for transferring data to or from computer devices having common addresses, the present invention allows a single CPU instruction to access two or more devices, connected to different computer system buses and operating at different speeds, without requiring special program software or custom hardware logic for each computer system bus.

An object of the present invention is to access I/O or memory of two or more devices which share common CPU address locations, but are connected to different speed buses and have different access times without requiring additional external logic.

Another object of the present invention is to work with all types of CPU bus cycles such as memory or I/O, read or write cycles.

Yet another object of the present invention is to simultaneously access other bus devices having the same address space as the local bus device being accessed without requiring additional external logic for each different bus device.

The preferred embodiment of the present invention described herein is configured for a computer system utilizing an Intel 80486 microprocessor. For exemplary purposes, the address and control signal designations referenced herein will be for the Intel® 80486 (Intel486)™ microprocessor functioning in the computer system as the central processing unit (CPU). One skilled in the art of computer systems could easily utilize the present invention in other computer systems utilizing different microprocessor integrated circuits such as, for example, the R6000 RISC, Motorola® 680040, or Intel Pentium. Any computer system having a local bus closely coupled to the CPU and at least one other bus used for peripheral devices, may utilize the method and apparatus of the present invention.

Referring now to the data book for the 80486 entitled "Intel Microprocessors, Volume I" (1992), incorporated herein by reference, the following control signals will be referred to in this disclosure:

Clock (CLK)—provides the fundamental timing for the Intel486 microprocessor.

Address Status Output (ADS)—indicates that the address and bus cycle definition signals are valid. This signal will go active in the first clock of a bus cycle, and go inactive in the second and subsequent clocks of the cycle.

Address—form the address bus and provide physical memory and I/O port addresses.

Non-burst Ready Input (Ready or RDY)—indicates that the current bus cycle is complete.

Backoff Input (BOFF)—asserting BOFF forces the Intel486 microprocessor to release control of its bus in the next clock. The processor remains in bus hold until BOFF is unasserted. If a bus cycle was in progress when BOFF is unasserted, the cycle will be restarted. BOFF has higher priority than RDY.

Bus Hold Request Input (HOLD)—allows another bus master to control the computer system bus.

The method and apparatus of the present invention accomplishes these objects in a single instruction access to both local bus and ISA bus external VGA palettes as follows:

(a) The CPU issues an I/O write instruction to bus addresses such as, for example, 3C6h, 3C7h, 3C8h, or 3C9h (hexadecimal base).

(b) The present invention detects the above bus addresses as being in a valid decode range and issues a local acknowledge which prevents the computer system core logic from processing the I/O write instruction (ISA bus).

(c) The present invention processes the I/O write instruction as a request.

(d) Upon completion of the write request, the present invention asserts both CPU BOFF and READY signals onto the computer system local bus.

(e) The CPU samples the BOFF signal and releases local bus control. The CPU ignores the READY signal because, in a 80486 microprocessor, the BOFF signal has higher priority than the READY signal.

(f) When the present invention releases the BOFF signal, it disables itself so as to ignore the next local bus cycle because after the invention issues the BOFF signal, the next local bus cycle is the same as the bus cycle just completed.

(g) The CPU reissues the previous bus cycle, in this example, the I/O write cycle to the ISA bus.

(h) the computer system core logic responds to the latest CPU bus cycle and the core logic issues the appropriate commands on the ISA bus because the present invention did not issue a local acknowledge signal during this cycle.

(i) The present invention monitors the CPU READY signal and once detected, the invention re-enables its local bus decode logic in anticipation of the next CPU bus cycle.

A feature of the present invention is to effectively duplicate device code addresses on different computer system buses without causing loss of data due to timing errors for one or more of the buses.

An advantage of the present invention is in allowing an 80486 microprocessor computer system to write to both a local bus external VGA palette and an ISA bus external VGA palette.

Other and further objects, features and advantages will be apparent from the following description of a presently preferred embodiment of the invention, given for the purpose of disclosure and taken in conjunction with the accompanying drawings.

DETAILED DESCRIPTION OF THE PREFERRED EMBODIMENT

Computer System

Figure 1:
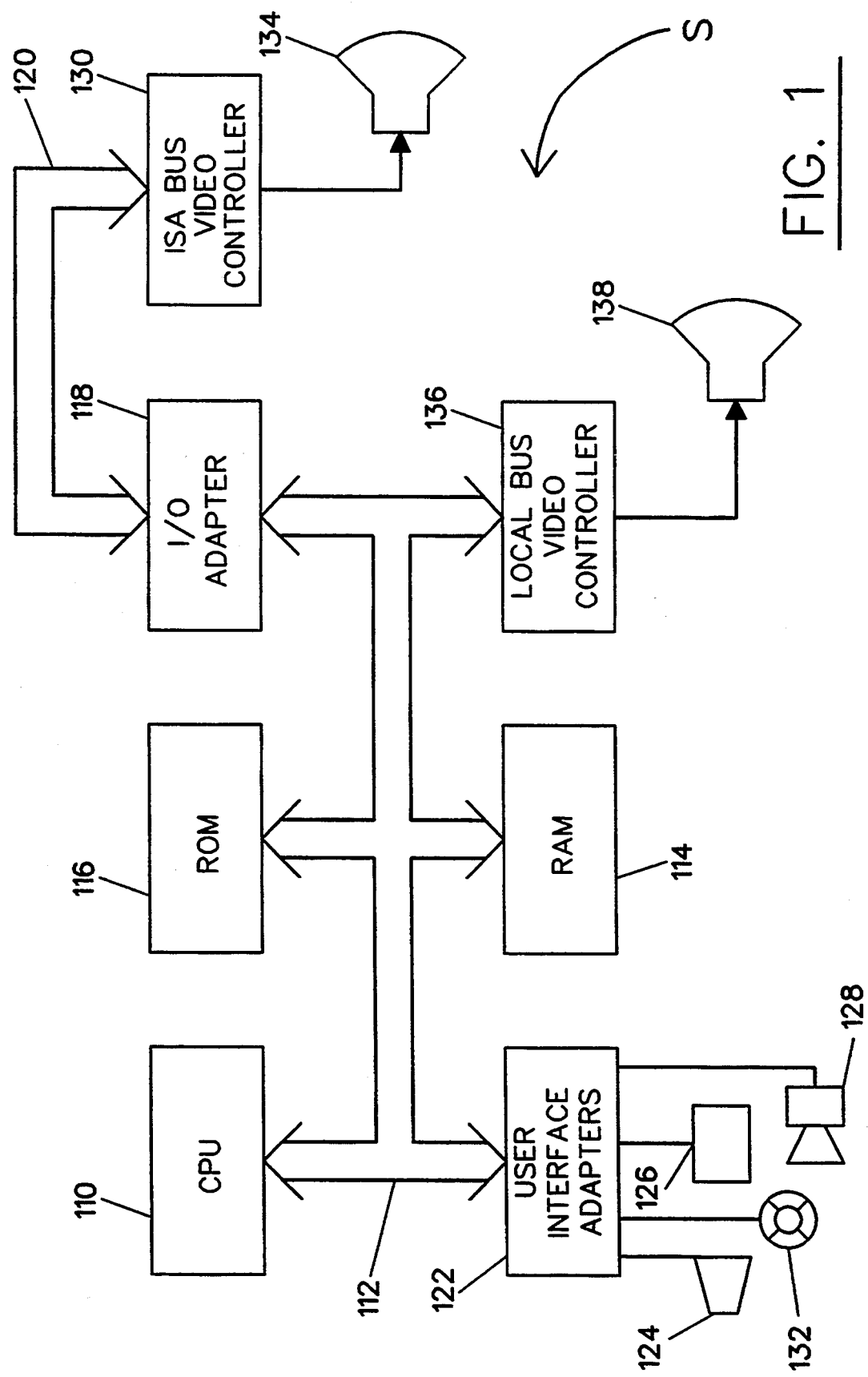
FIG. 1 is a schematic block diagram of a computer system utilizing the present invention.

Referring now to the drawings, the details of the preferred embodiment are schematically illustrated. In the drawings the letter S designates generally a computer system. A representative hardware environment for the present invention is depicted in FIG. 1 which illustrates a suitable hardware configuration of a computer system S in accordance with the present invention. The computer system S has a central processing unit 110, such as a conventional microprocessor, and a number of other devices interconnected via a computer system bus 112. The computer system S comprises a random access memory 114 (RAM), a read only memory 116 (ROM), an I/O adapter 118 for connecting ISA VGA adapter 130 driving a video monitor 134, a user interface adapter 122 for connecting a keyboard 124, a mouse 126, a speaker 128, a microphone 132, and/or other user interface devices (not illustrated) to the bus 112. The present invention is a local bus video graphics adapter (VGA) 136 connected to the computer system S CPU 110 through bus 112. The local bus VGA 136 is connected to a video monitor 138.

Operation of the Preferred Embodiment

Figure 2:
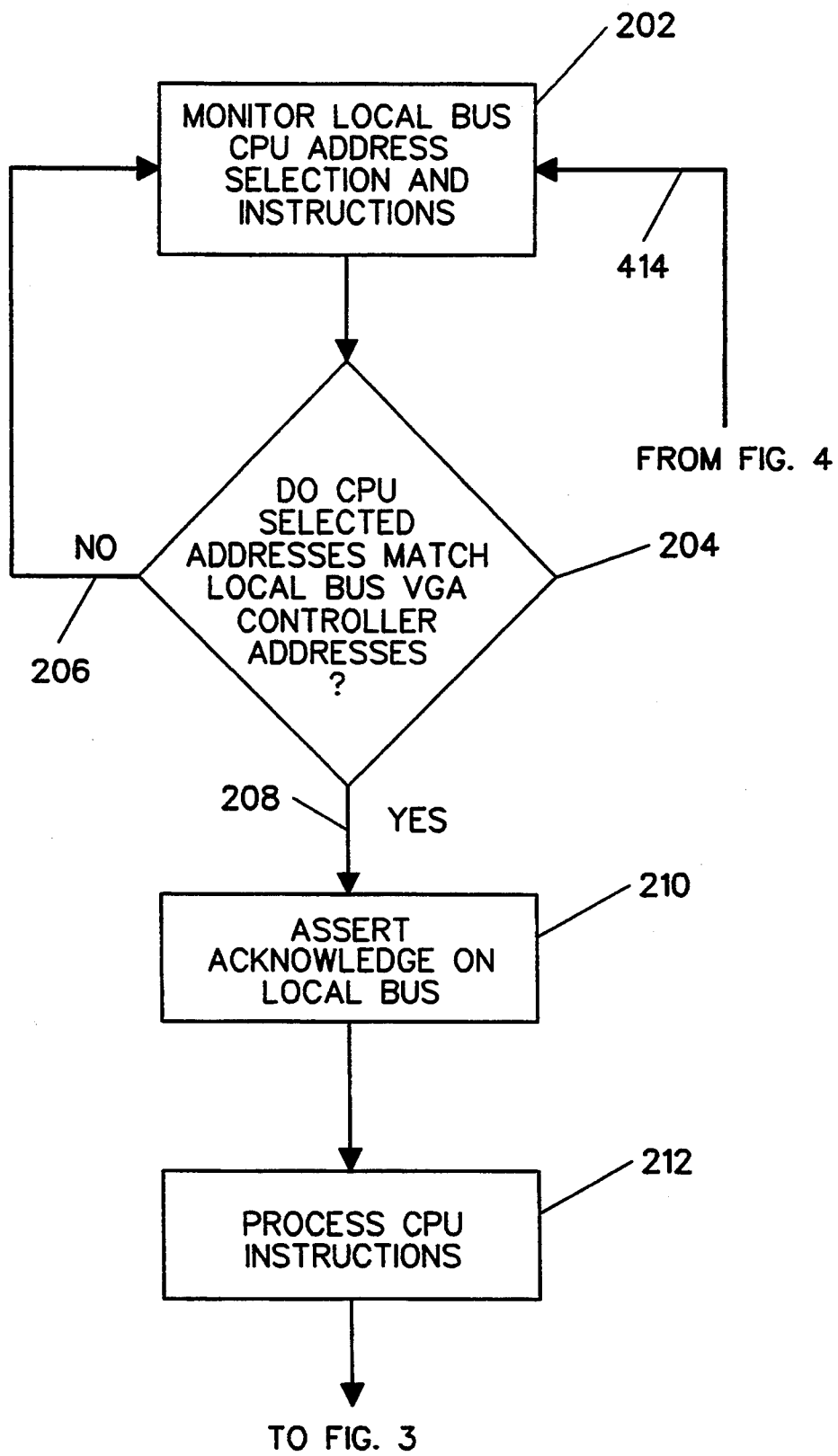
FIGS. 2 through 4 are schematic logic flow diagrams illustrating the operational steps of the preferred embodiment of the present invention.
Figure 3:
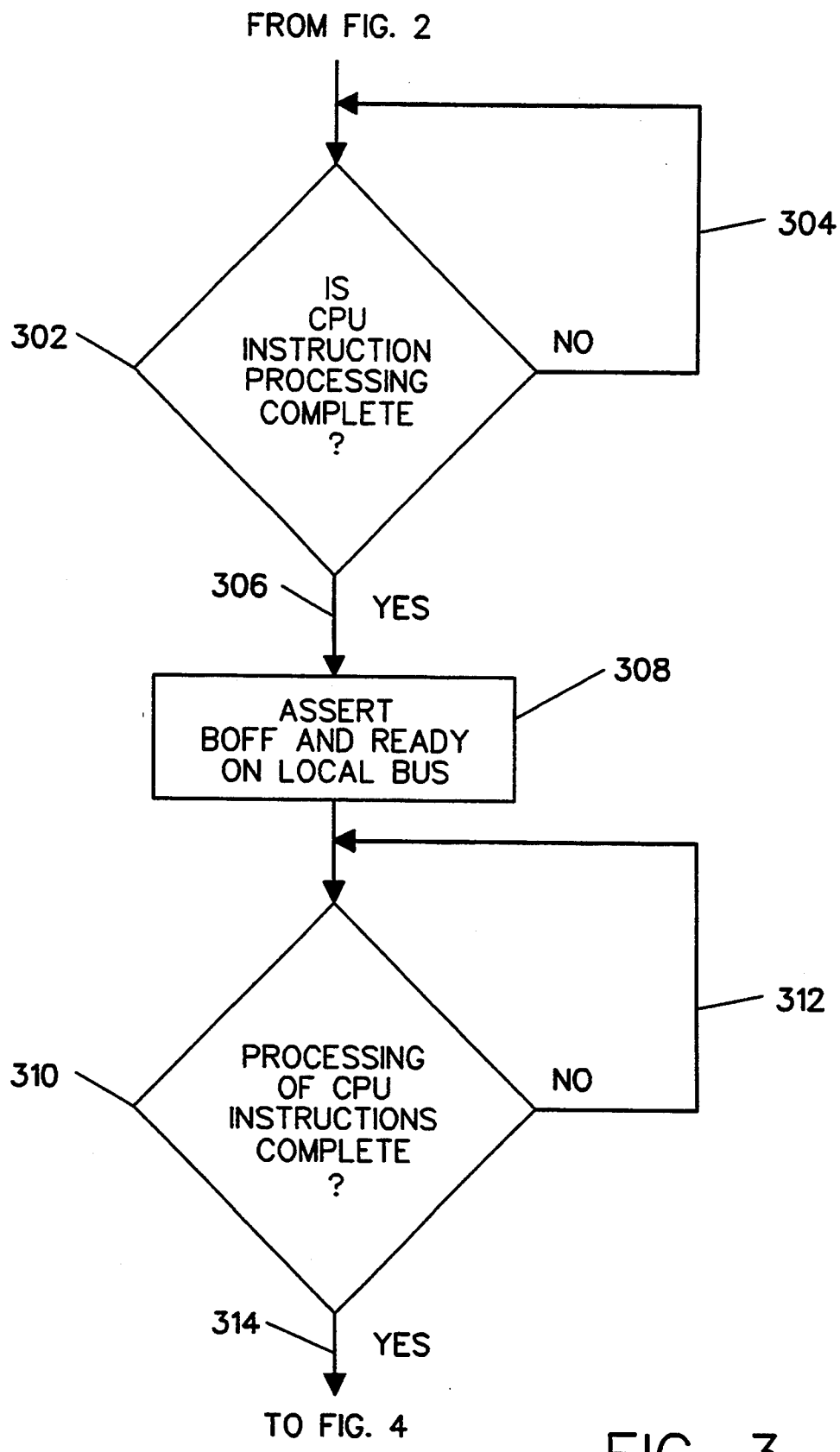
Figure 4:
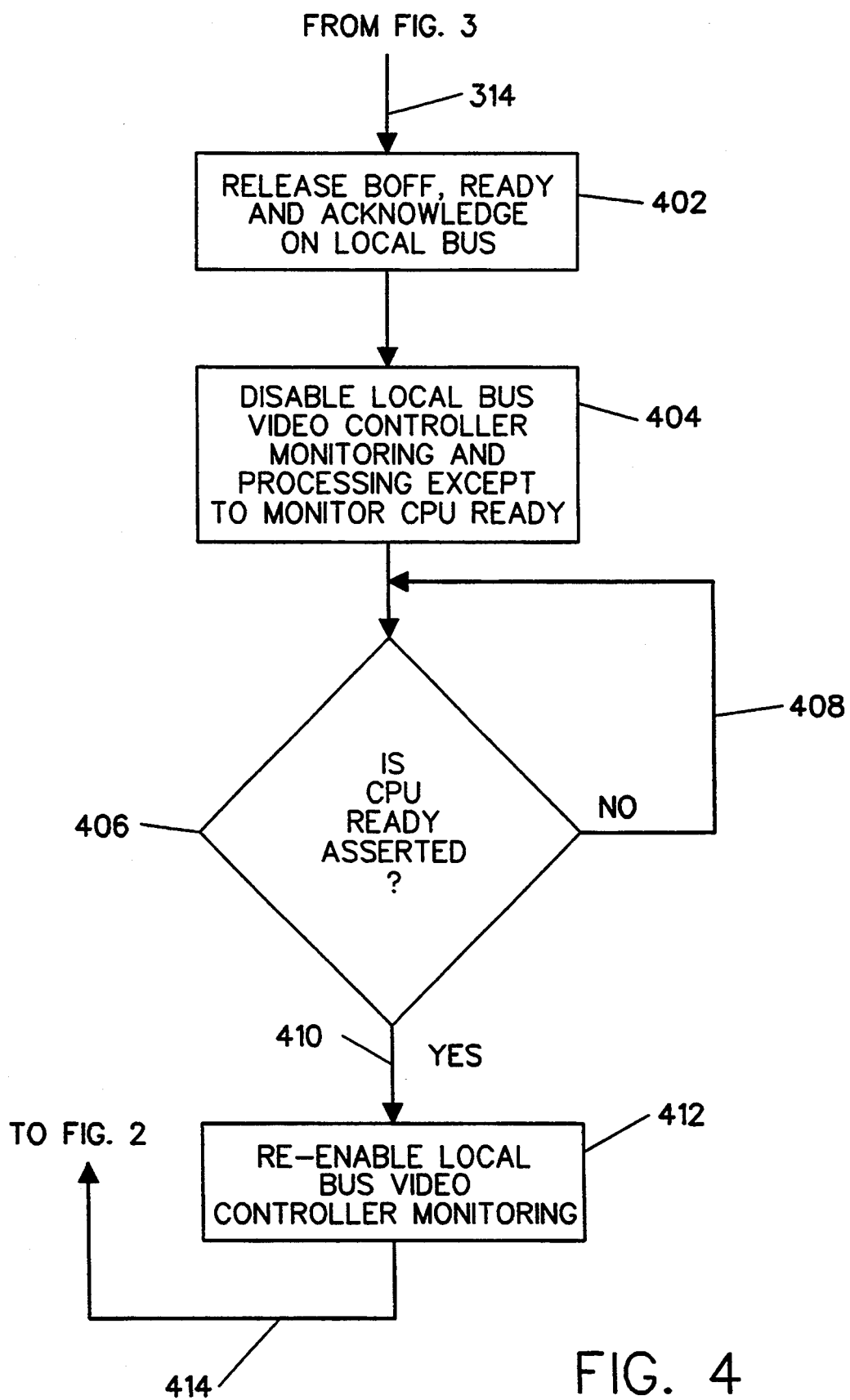
Figure 5:
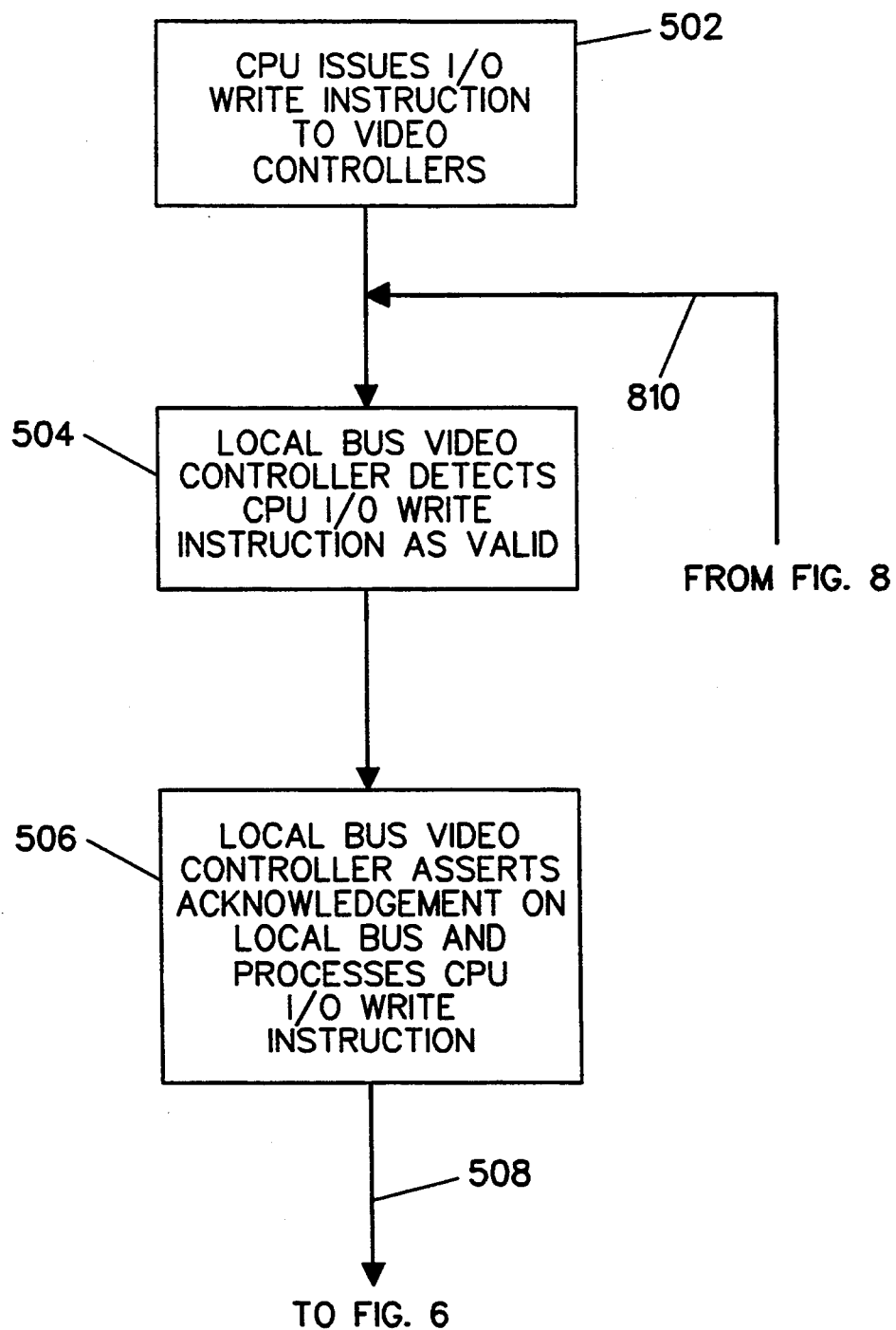
FIGS. 5 through 8 are schematic logic flow diagrams of the preferred embodiment of the present invention utilized in a computer system.
Figure 6:
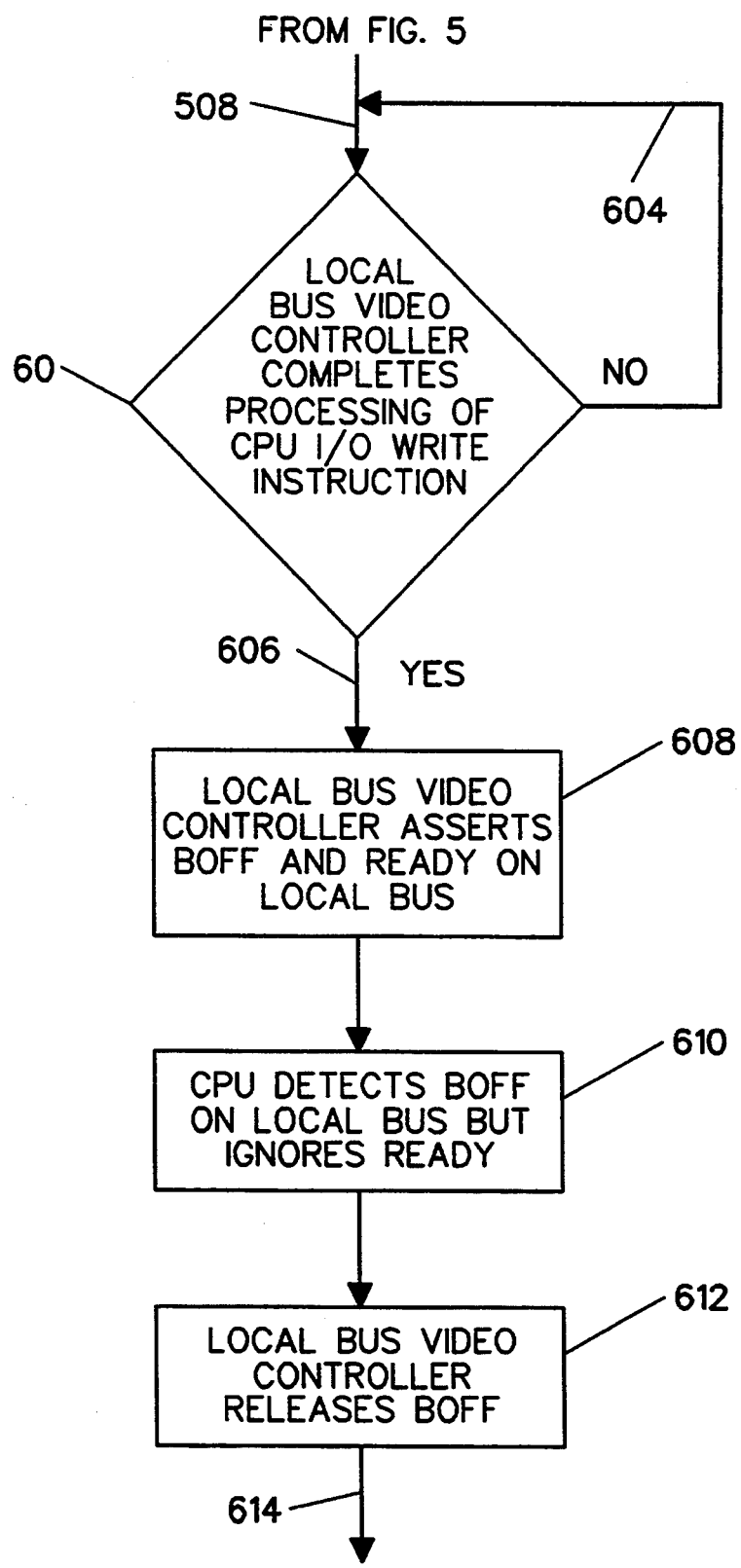
Figure 7:
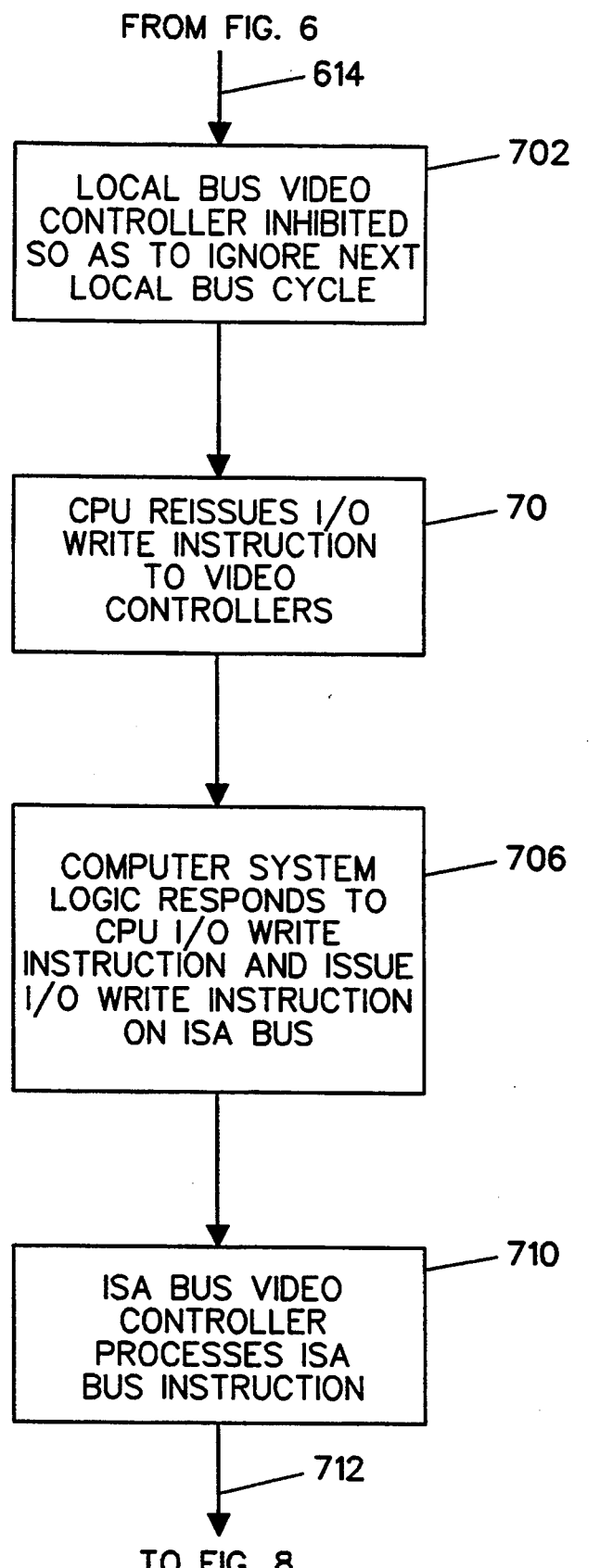
Figure 8:
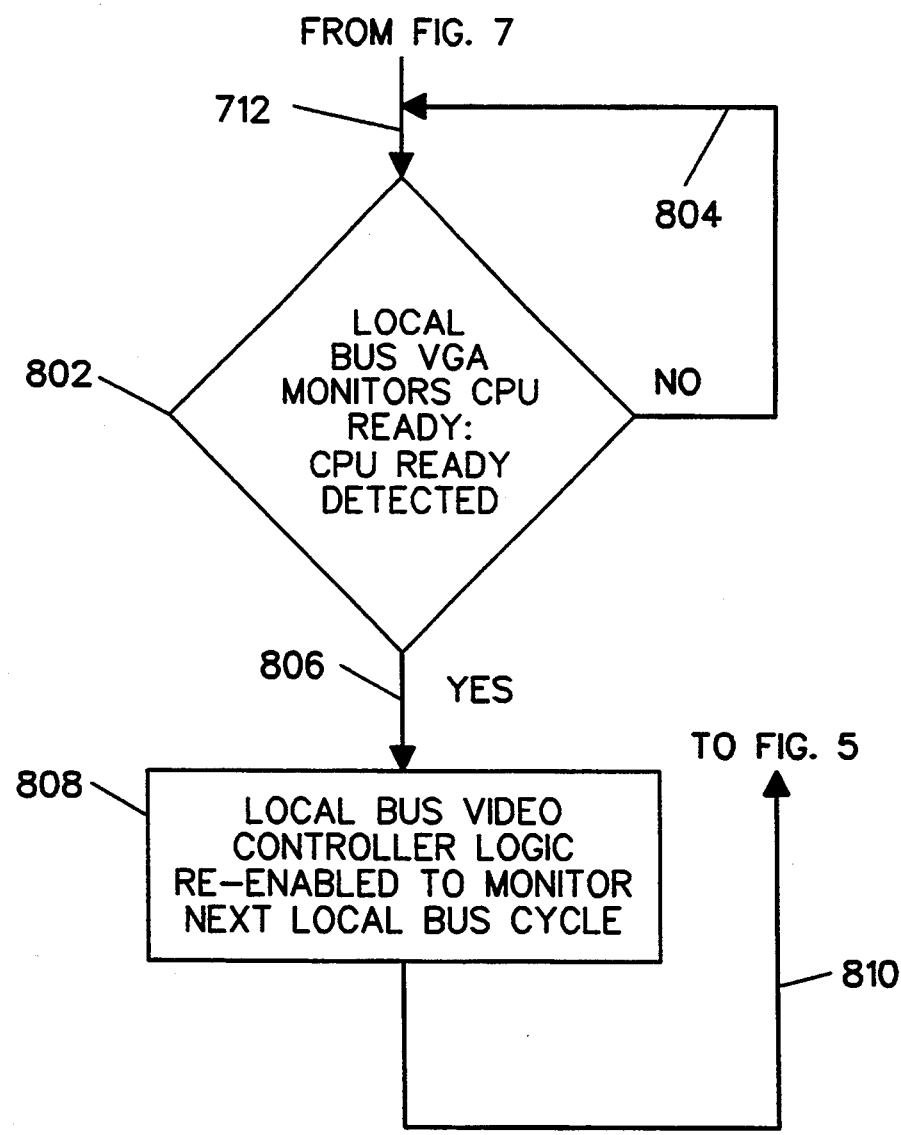

Referring now to FIGS. 2 through 4, a logic flow diagram schematically illustrates the functional operation of the method and apparatus of the preferred embodiment of the present invention. The local bus VGA 136 connected to bus 112 (FIG. 1) monitors the local bus CPU address selection for determining when predetermined addresses associated with the VGA 136 are present on bus 112.

Step 202 causes the system of the present invention to monitor the local bus address and control signals. Step 202 decodes the local bus CPU address and control signals and sends the decoded information to decision step 204 which determines if the CPU selected addresses match the VGA controller 136 addresses. If the addresses to do not match, then decision branch 206 returns control to step 202 which continues to monitor the CPU address and control signals.

When there is an address match, decision step 204 causes branch 208 to enable step 210 which causes logic within VGA 136 to assert an acknowledge on the computer system local bus. Step 212 causes VGA 136 to process the CPU instructions. Decision step 302 monitors the instruction processing until complete. During processing of the CPU instruction branch 304 maintains the logic and control of VGA 136 until the instruction is processed to completion. When the VGA completes processing of the CPU instruction, branch 306 enables control step 308 causing the logic within VGA 136 to assert BOFF and READY on the local bus.

Decision step 310 determines whether processing of CPU instructions are complete where branch 312 returns control to step 310 until the CPU instruction processing is completed. When the CPU instruction is completed, decision step 310 causes branch 314 to pass control to Step 402. Step 402 causes the logic in VGA 136 to release the BOFF, READY and Acknowledge signals on the local bus.

Step 404 causes the VGA logic to disable the VGA 136 monitoring and processing except for monitoring of the CPU READY signal. Step 406 monitors assertion of the CPU READY signal on the local bus and, when asserted, decision branch 410 passes control to step 412 which causes the VGA 136 logic to re-enable the local bus monitoring functions. After the VGA 136 local bus monitoring functions are reenabled, branch 414 returns control back to step 202 which then causes the VGA 136 logic circuits to begin monitoring the local bus CPU address selection and instructions again.

Referring to FIGS. 5 through 8, step 502 illustrates when the CPU 110 issues an I/O write instruction to VGAs 136 and 130. VGA 136 receives CPU instruction over bus 112 and VGA 130 receives CPU instruction over bus 120. Step 504 causes the VGA 136 to detect the CPU I/O write instruction as valid and then passes control to step 506. Step 506 causes the local bus VGA 136 logic to assert acknowledge on the local bus and process the CPU I/O write instruction. Step 602 monitors the progress of the local bus VGA 136 in processing the CPU I/O write instruction. When processing is complete, branch 606 enables step 608 to cause the VGA 136 logic to assert BOFF and READY on the local bus 112.

Step 610 illustrates when the CPU 110 detects the BOFF signal on the local bus, the CPU 110 will ignore the READY signal because in an Intel 80486 microprocessor system, the BOFF signal has higher priority than the READY signal. Step 612 illustrates when the VGA 136 logic releases the local bus BOFF signal. The VGA 136 logic is inhibited during step 702 so that the next local bus cycle issued from the CPU 110 is ignored by the VGA 136 logic. This allows the ISA bus VGA 130 to receive, acknowledge and process the CPU 110 I/O write instruction during steps 704 and 706. Step 710 illustrates when the ISA bus VGA 130 processes the instructions on the ISA bus 120 from I/O adapter 118. After processing of the ISA bus device, decision step 802 determines when the CPU READY signal is detected on the local bus. When READY is detected, step 802 causes branch 806 to enable step 808 which causes the VGA 136 logic to re-enable and begin monitoring the bus 112 for the next CPU bus cycle. Branch 810 returns bus monitoring control to step 504.

Timing Diagram of the Present Invention

Figure 9:
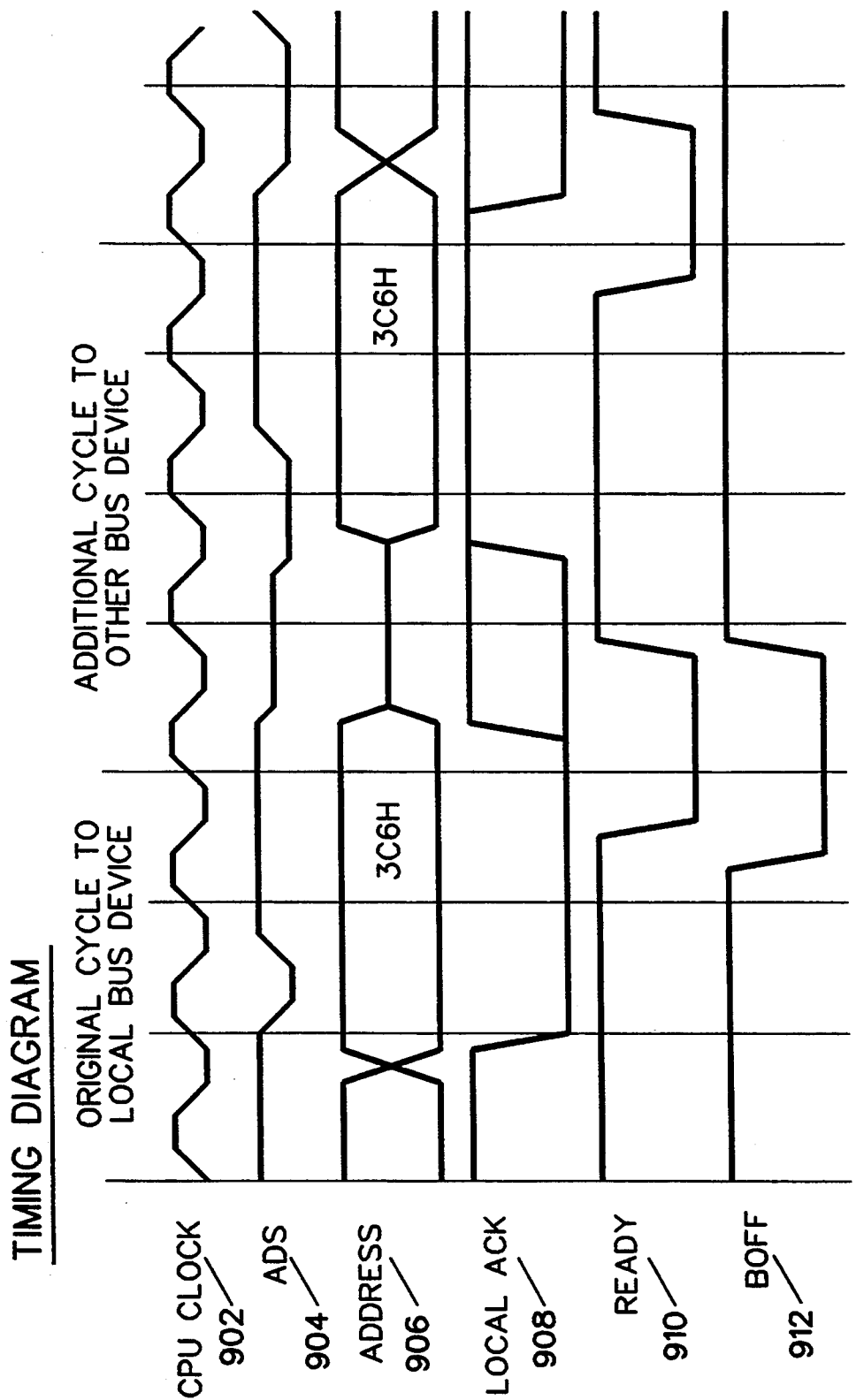
FIG. 9 is a schematic timing diagram of signals associated with the preferred embodiment of the present invention.

Referring now to FIG. 9, a timing diagram of the preferred embodiment of the present invention is schematically illustrated. Two computer instruction cycles are illustrated, the first cycle is directed to the local bus device of the present invention. The second cycle is directed to the other bus device such as, for example, the ISA bus device 130.

CPU clock 902 determines timing for the bus cycles. Address status output (ADS) 904 indicates when the address definition signals are valid during the bus cycle. Address 906 are signals on the address bus and provide the physical memory and I/O port addresses. Local acknowledge (Local ACK) 908 is a signal from the local bus VGA 136 which prevents the computer system core logic from issuing CPU commands to the ISA bus VGA 130 by inhibiting operation of the I/O adapter 118.

READY 910 indicates that the current bus cycle is complete. BOFF 912, when asserted, forces the CPU 110 to release control of the bus until the next clock 902. CPU 110 remains on hold until BOFF 912 is unasserted. If a bus cycle was in progress when BOFF 912 is unasserted, that bus cycle will be restarted. Thus, the CPU 110 asserts an additional duplicate cycle to the second bus device (ISA bus).

The preferred embodiment of the present invention utilizing an Intel 80486 microprocessor has been described in some detail to enable one skilled in the art to replicate the method and apparatus of the present invention. The present invention allows writing to and reading from, two or more peripheral devices such as video graphic adapter controllers on different computer system buses. Each bus may have different timing without requiring modification to the computer system hardware logic. Special computer programs are not required for individually accessing each VGA controller or peripheral, thus unnecessarily slowing down system throughput. System throughput is especially critical in updating high resolution color video displays. Other and further types of CPUs and computer systems may benefit from the method and apparatus of the present invention, and would be readily apparent to those skilled in the art of computer systems design.

The system and method of the present invention, therefore, is well adapted to carry out the objects and attain the ends and advantages mentioned, as well as others inherent therein. While a presently preferred embodiment of the invention has been given for purposes of disclosure, numerous changes in the details of construction, interconnection and arrangement of parts will readily suggest themselves to those skilled in the art, and which are encompassed within the spirit of the invention and the scope of the appended claims.

What is claimed is:

1. A method for writing data to two or more computer devices having common addresses but on different computer system buses, comprising the steps of:
    (a) asserting computer device addresses and data on the computer system buses by the computer system central processing unit (CPU);
    (b) asserting a first acknowledge signal on a first bus of the computer system buses by a first bus computer device when predefined addresses match the asserted computer device addresses, wherein the asserted first acknowledge signal prevents the computer system core logic from processing the computer device addresses and data on a second bus;
    (c) processing the asserted addresses and data by the first bus computer device;
    (d) asserting a backoff signal on the first bus by the first bus computer device which causes the CPU to repeat the same computer device addresses and data on the computer system buses as was asserted in step (a);
    (e) reasserting the same computer device addresses and data as was asserted in step (a) on the computer system buses by the CPU, wherein the first bus computer device now ignores the addresses and data on the first bus and the second bus computer device processes the reasserted addresses and data on a second bus of the computer system buses when predefined addresses match the reasserted computer device addresses; and
    (f) resetting the first bus computer device after the second bus computer device asserts an acknowledge signal to the CPU that it has processed the reasserted addresses and data of step (e), wherein the first bus computer device is ready to process next computer device addresses and data asserted by the CPU.

2. A computer interface first device adapted for connection to a first bus of a computer system central processing unit (CPU) that functions with a second device connected to a second bus of the computer system and both configured to respond to the same addresses and receive the same data, said first device comprising:
    first logic circuits for detecting addresses and data asserted by the CPU on the first and second buses, said first logic asserting an acknowledge signal on the first bus when predefined addresses are detected, wherein the acknowledge signal prevents the second device from processing the addresses and data asserted by the CPU on the second bus;
    second logic circuits for asserting a back off signal on the first bus after the first device has finished processing the addresses and data asserted by the CPU, wherein the back off signal causes the CPU to repeat the same addresses and data on the first and second buses so that the second device can now process the same addresses and data asserted by the CPU;
    said second logic circuits also disables the first logic so that the first device ignores the same addresses and data assert by the CPU during the repeat of the same addresses and data by the CPU on the first and second buses; and
    third logic circuits for detecting the completion of processing of the same addresses and data by the second device, wherein after said third logic circuit detects the completion of the processing of the same addresses and data by the second device, said first device is re-enabled so that the first device can process next addresses and data asserted by the CPU.

3. The apparatus of claim 2, wherein the first device is a local bus video graphics adapter and the first bus is a computer system local bus.

4. The apparatus of claim 2, wherein the second device is an industry standard architecture bus video graphics adapter and the second bus is a computer system industry standard architecture bus.

* * * * *